United States Patent [19]

Nissen

[11] Patent Number: 4,773,000
[45] Date of Patent: Sep. 20, 1988

[54] DMA FOR DIGITAL COMPUTER SYSTEM

[75] Inventor: Stanley M. Nissen, Reading, Mass.

[73] Assignee: Raytheon Company, Lexington, Mass.

[21] Appl. No.: 931,000

[22] Filed: Nov. 14, 1986

Related U.S. Application Data

[63] Continuation of Ser. No. 865,950, May 19, 1986, abandoned, which is a continuation of Ser. No. 572,799, Jan. 23, 1984, abandoned.

[51] Int. Cl.⁴ .............................................. G06F 13/20
[52] U.S. Cl. .............................................. 364/200
[58] Field of Search ............................ 364/200, 900

[56] References Cited

U.S. PATENT DOCUMENTS

| Re. 26,832 | 3/1970 | Randlev | 340/172.5 |
|---|---|---|---|
| 3,909,799 | 9/1975 | Recks et al. | 364/200 |
| 4,067,059 | 1/1978 | Derchak | 364/200 |
| 4,075,691 | 2/1978 | Davis et al. | 364/200 |
| 4,091,455 | 5/1978 | Woods et al. | 364/200 |
| 4,245,305 | 1/1981 | Gechele et al. | 364/200 |

OTHER PUBLICATIONS

Nissim, Joseph; "DMA Controller Capitalizes on Clock Cycles to Bypass CPU"; 1/78; Computer Design.

Primary Examiner—Gary V. Harkcom
Assistant Examiner—C. H. Lynt
Attorney, Agent, or Firm—Philip J. McFarland; Richard M. Sharkansky

[57] ABSTRACT

An arrangement to couple at least one I/O device to the main bus between a CPU and a main memory in a digital computer system is shown to include a random access memory made up of a dedicated part of the main memory and control circuitry to allow access between addresses in the random access memory and either the CPU or the at least one I/O device, such circuitry being arranged to give priority of access to the CPU except when data is actually being transferred from the I/O device and the random access memory.

1 Claim, 2 Drawing Sheets

DMA FOR DIGITAL COMPUTER SYSTEM

The Government has rights in this invention pursuant to Contract No. DAAH01-82-C-A010 awarded by the Department of the Army.

This application is a continuation of application Ser. No. 865,950 filed May 19, 1986, which is a continuation of application Ser. No. 572,799 filed Jan. 23, 1984, now abandoned.

BACKGROUND OF THE INVENTION

This invention pertains generally to digital computers and in particular to a direct memory address (DMA) system for linking peripheral devices to such a computer.

As is known, a digital computer may be equipped with a DMA capability to allow various types of input-/output devices (I/O devices) to be connected, usually over a shared memory bus. Unfortunately, the use of a shared memory bus requires that the operation of the central processing unit (CPU) of the computer be temporarily halted whenever data is to be passed to (or from) an I/O module. Obviously, if there are many I/O modules connected in the system, the frequency of these interruptions may be so great that the efficiency of the system is degraded to an unacceptable degree.

It is known that I/O devices may be connected to a computer system through arrangements including a buffer memory. For example, as shown and described, a magnetic drum is arranged so as to be accessible independently to the CPU of a computer system and to a selected one of a plurality of I/O devices. While such an arrangement is useful in many "low speed" applications in which interruption of the CPU are of little moment, the time required to access any given address is too long to allow use in "high speed" applications in which the frequency and duration of CPU interruption must be reduced to a minimum.

SUMMARY OF THE INVENTION

With the foregoing background of the invention in mind it is an object of this invention to provide a DMA system for a digital computer wherein CPU interruptions are reduced to a minimum.

It is another object of this invention to provide a DMA system for a digital computer that obviates any requirement for contention among various I/O modules.

It is yet another object of this invention to provide a DMA system for a digital computer wherein each DMA controller is required to address only a limited portion of CPU memory, thus reducing the complexity of the DMA controller.

These and other objects of this invention are generally attained by providing a digital computer system having a plurality of I/O modules interposed between the CPU of such system and I/O devices. Each I/O module includes a DMA controller and a random access buffer memory formed from a dedicated main memory of the computer system.

BRIEF DESCRIPTION OF THE DRAWINGS

Other objects and many of the attendant advantages of this invention will be readily appreciated as the same become better understood by reference to the following detailed description when considered in connection with the accompanying drawings wherein.

DESCRIPTION OF THE PREFERRED EMBODIMENT

Before proceeding with a detailed exposition of a data processing system according to this invention, it should be noted that the invention lies in an improved module interposed between the CPU of a digital computer and an I/O device. Since this is so, it is felt that a general description of the architecture of a complete digital computer and a detailed description of known elements (such as clock generators and read/write mechanisms) is not required to enable a person of ordinary skill in the art to practice the invention. In addition, because the invention may be used with any known types of I/O devices, any known kind of memory device used in a digital computer as main memory and serial or parallel processing, the elements making up the contemplated module are shown in block form, it being understood that each such element is known, per se. Finally, it should be noted that only a single I/O module and remote I/O device are illustrated although any number of remote I/O devices may be accommodated providing, however, that the I/O module has a sufficient number of channels.

Figure 1:
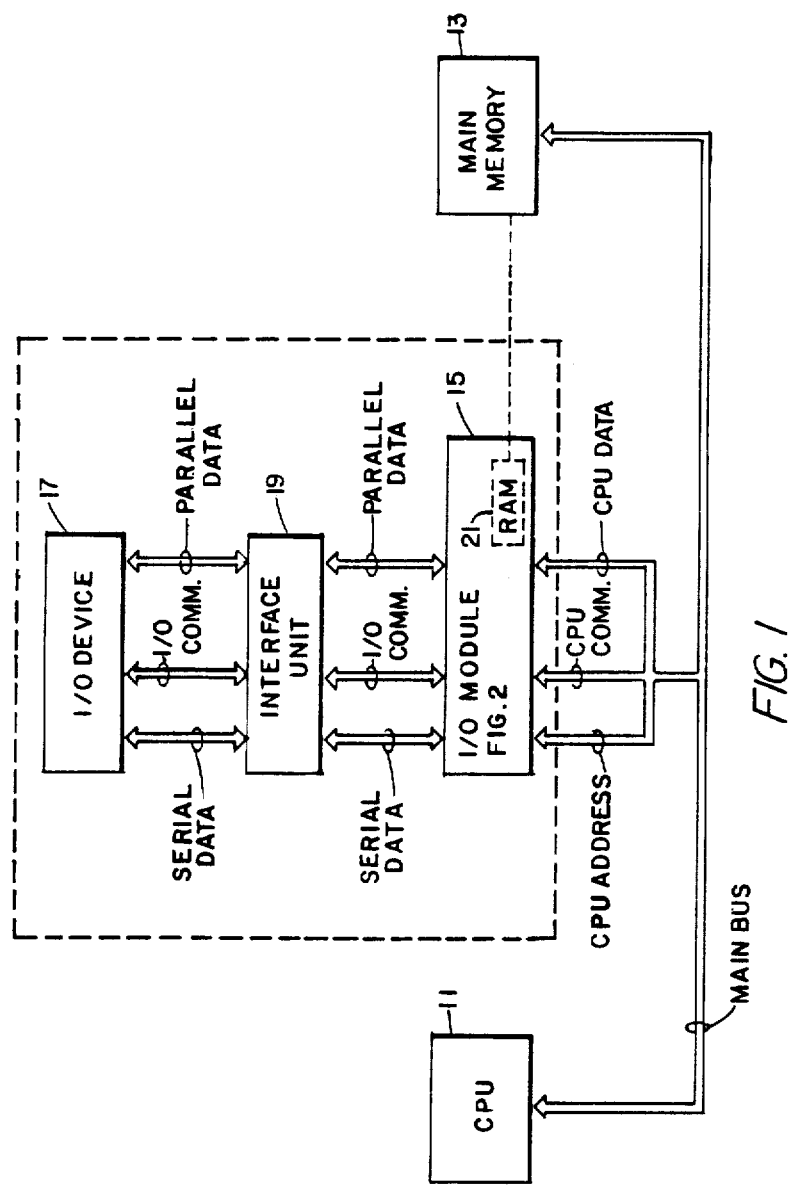
FIG. 1 is a simplified block diagram of a data processing system according to this invention.

Referring now to FIG. 1 it may be seen that an I/O module 15 is connected in a conventional manner to the main bus (not numbered) of a digital computer (not numbered) between a CPU 11 and a main memory 13. An interface unit 19 of known construction is connected between the I/O module 15 and an I/O device 17. It will be appreciated that the interface unit 19 is provided to convert the format of data to and from the particular type of I/O device 17 being used to the format of the data on the main bus (not numbered) and in the main memory 13. Thus, depending upon the particular I/O device, the interface unit 19 may include analog-to-digital converters, digital-to-analog converters and serial-to-parallel converters. It will also be appreciated that, whether the format of each word of the data on the main bus is serial or parallel, each word has an address field, a command field and a data field (here designated as being on buses marked, respectively, as "CPU ADDRESS BUS," "CPU COMMAND BUS" and "CPU DATA BUS." It will also be appreciated that other signals (such as clock pulses and read/write command signals) required for operation but not for an understanding of the invention are passed over the main bus (not numbered). Finally, and most importantly, it will be noted that, as shown in broken line, a dedicated section of the main memory 13 is here used as a random access memory (RAM 21) in the I/O module 15 and that different dedicated sections of the main memory 13 are used for any other I/O modules connected to the main bus.

Figure 2:
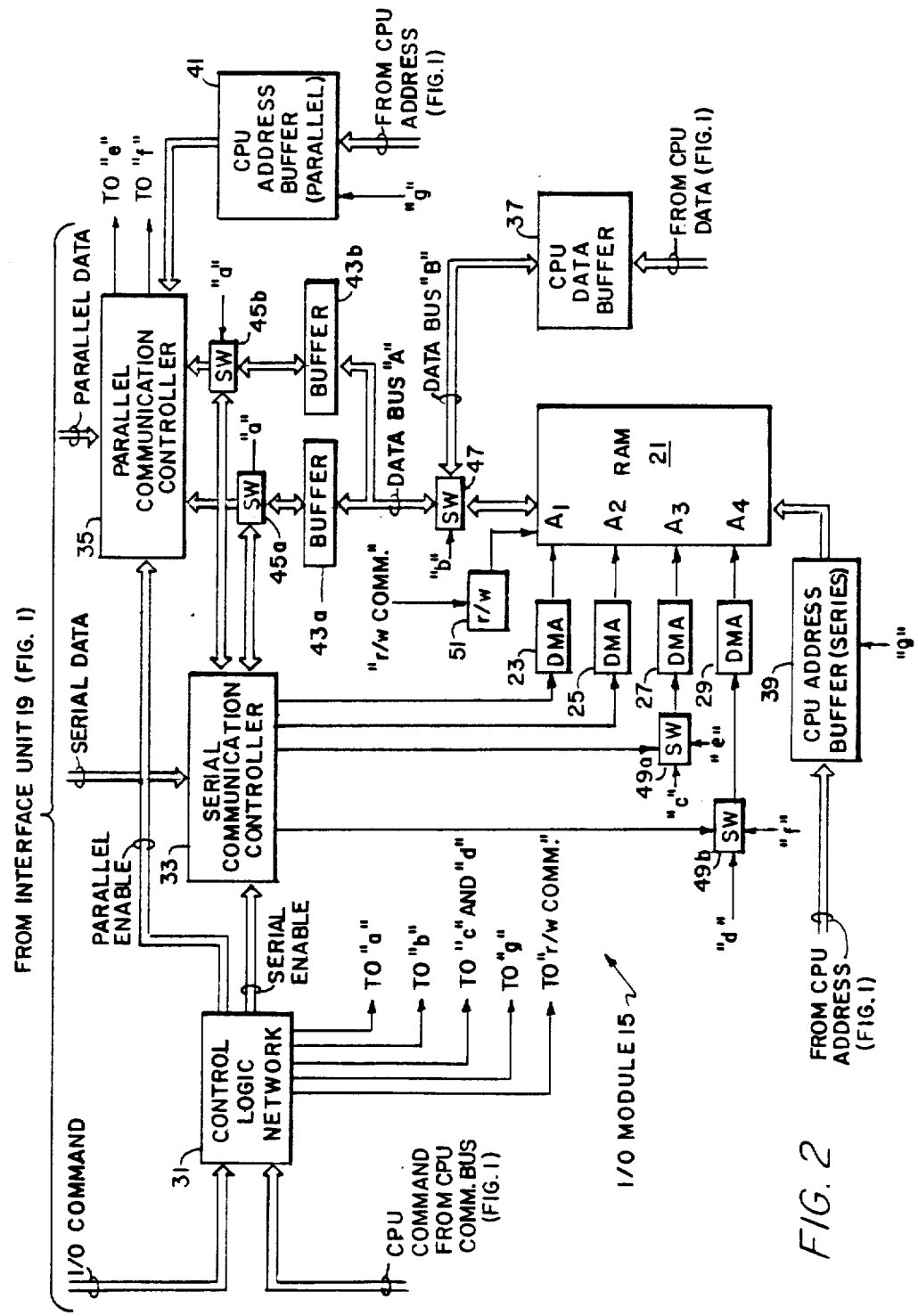
FIG. 2 is a simplified block diagram illustrating the data flow within the I/O module of FIG. 1.

Before referring to FIG. 2 in detail it will be noted that the elements within the I/O module 15 are by and large shown to be "hard-wired" through switching arrangements. It will become apparent, however, that the various elements could be "addressable" units to eliminate the various switching arrangements. Turning now to FIG. 2, the I/O module 15 is shown to include a random access memory 21, consisting of a dedicated section of the main memory 13 (FIG. 1). Addressing of the RAM 21 is effected from either the CPU AD- DRESS BUS (not numbered) or through any one of four elements, DMA 23, 25, 27, 29 (Model AM2940 devices from AMD, (Advanced MicroDevices, Inc.), 901 Thompson Place, Sunnyvale, Calif. in a manner to be described. Data to be written in (or read out of) the RAM 21 is extant on the buses marked DATA BUS "A" or DATA BUS "B".

To effect the foregoing, any extant CPU COMMAND and I/O COMMAND are applied to a control logic network 31, here a conventional logic matrix responsive to either, or both, of the applied commands to: (a) address the RAM 21 through one of the DMA 23, 25, 27; 29 or (in a manner to be described) by the CPU ADDRESS; (b) write (in a manner to be described) serial data derived from either the I/O device 17 (FIG. 1) over DATA BUS "A" or the CPU DATA BUS (FIG. 1) over DATA BUS "B" at the selected address in the RAM 21; (c) read serial data at the selected address in the RAM 21 and ultimately pass such data (over DATA BUS "A" or DATA BUS "B") to the I/O device 17 (FIG. 1) or to the CPU DATA BUS to the CPU 11 (FIG. 1); or (d) pass parallel data from the CPU DATA BUS to the I/O device 17 (FIG. 1). In connection with the foregoing, it should be noted that the control logic network 31 is arranged to give priority to the CPU COMMAND except in the single case wherein data from the I/O device 17 (FIG. 1) is in the process of being written in the RAM 21 and access to the RAM 21 is commanded by the CPU COMMAND. In only such case (which would occur but rarely) an interrupt of communication with the CPU 11 (FIG. 1) occurs.

A SERIAL ENABLE or a PARALLEL ENABLE signal is passed as shown from the control logic network 31 to, respectively, a serial communication controller 33 or a parallel communication controller 35 to enable one or the other. The serial communication controller 33 is a Model Z8530A from ZILOG, Inc., Dell Avenue, Campbell, Calif. 95008. The parallel communication controller 35 is a model AM7303B device from AMD.

The CPU DATA BUS (FIG. 1) is connected to a CPU DATA BUFFER 37 (here a Model AM7303B device from Advanced MicroDevices, Inc., 401 Thompson Place, Sunnyvale, Calif.) and the CPU ADDRESS BUS (FIG. 1) is connected to two buffers designated respectively as CPU ADDRESS BUFFER (SERIES) 39 and CPU ADDRESS BUFFER (PARALLEL) 41. The two just-mentioned buffers are Model 54LS244 devices from Texas Instruments, Inc., Dallas, Tex. 75222. It will be noted that the buffers 39, 41 are addressable, meaning that the particular CPU address extant at any time determines which of the two may be enabled.

Interposed between the RAM 21, the CPU DATA BUFFER 37, the serial communication controller 33 and the parallel communication controller 35 are buffers 43a, 43b and switches 45a, 45b, 47. The buffers 43a, 43b are Model AM7304B devices from Advanced MicroDevices, Inc. It will be appreciated that each one of the buffers 43a, 43b is an eight-bit device and, therefore, that the two together accommodate 16 bit words on DATA BUS "A". The switches 45a, 45b connect, in accordance with actuating signal "a" out of the control logic network 31, either the serial communication controller 33 or the parallel communication controller 35 to the buffers 43a, 43b. The switch 47 connects, in accordance with actuating signal "b" out of the control logic network 31, either the buffers 43a, 43b or the CPU DATA BUFFER 37 to the RAM 21.

To complete the description, switches 49a, 49b and a read/write controller (R/W 51), each responsive to control signals as indicated out of the control logic network 31, allow addressing of DMA 27 and DMA 29 (if parallel data is to be passed to or from RAM 21) and recording or reading of data at a selected address (A1, A2, A3, A4) in the RAM 21.

Having described a layout of an exemplary I/O module, it will now be apparent that the listed objects of this invention are met. Thus, because the control logic network 31 is arranged to give the CPU COMMAND priority (except when an I/O COMMAND is actually being executed), the number of CPU interruptions is reduced to a minimum. Because the RAM 21 in each one of the different I/O modules is a separate dedicated part of the main memory 13 (FIG. 1), there is no need for contention among I/O modules. The DMA controllers need only address the RAM 21, rather than the entire CPU memory, thus reducing the controller's complexity.

It will now be apparent that changes may be made without departing from the inventive concepts. For example, if the I/O module is to be used in a digital computer system wherein only serial data is to be processed, the elements required for parallel data may be eliminated. Similarly, if the digital computer system processes only parallel data, the elements required for serial data may be eliminated. It is felt, therefore, that this invention should not be restricted to the disclosed embodiment, but rather should be limited only by the spirit and scope of the appended claims.

What is claimed is:

1. In a digital computer system wherein a central processing unit (CPU) is connected over a main bus to a main memory and each one of a plurality of input/output (I/O) devices is connected, through an associated input/output module, to a dedicated part of the main memory, each one of the associated I/O modules comprising:

(a) a random access memory making up the dedicated part of the main memory addressable by the CPU and the associated I/O device;

(b) control logic network means, responsive to a coded command signal from the CPU and a coded command signal from the associated I/O device, for producing enabling signals indicative of the format of data to be processed, the desired direction of transmission of such data and the source of such data, such control logic network means being responsive to the coded command signal from the CPU in all cases except when the coded command signal from the I/O device indicates that data from the I/O device is being written in the random access memory; and (c) switching means, responsive to the enabling signals indicative of the format of the data, the source of the data and the desired direction of transmission of the data for selectively addressing the random access memory by the CPU or the I/O device.

* * * * *